United States Patent Office 3,594,442
Patented July 20, 1971

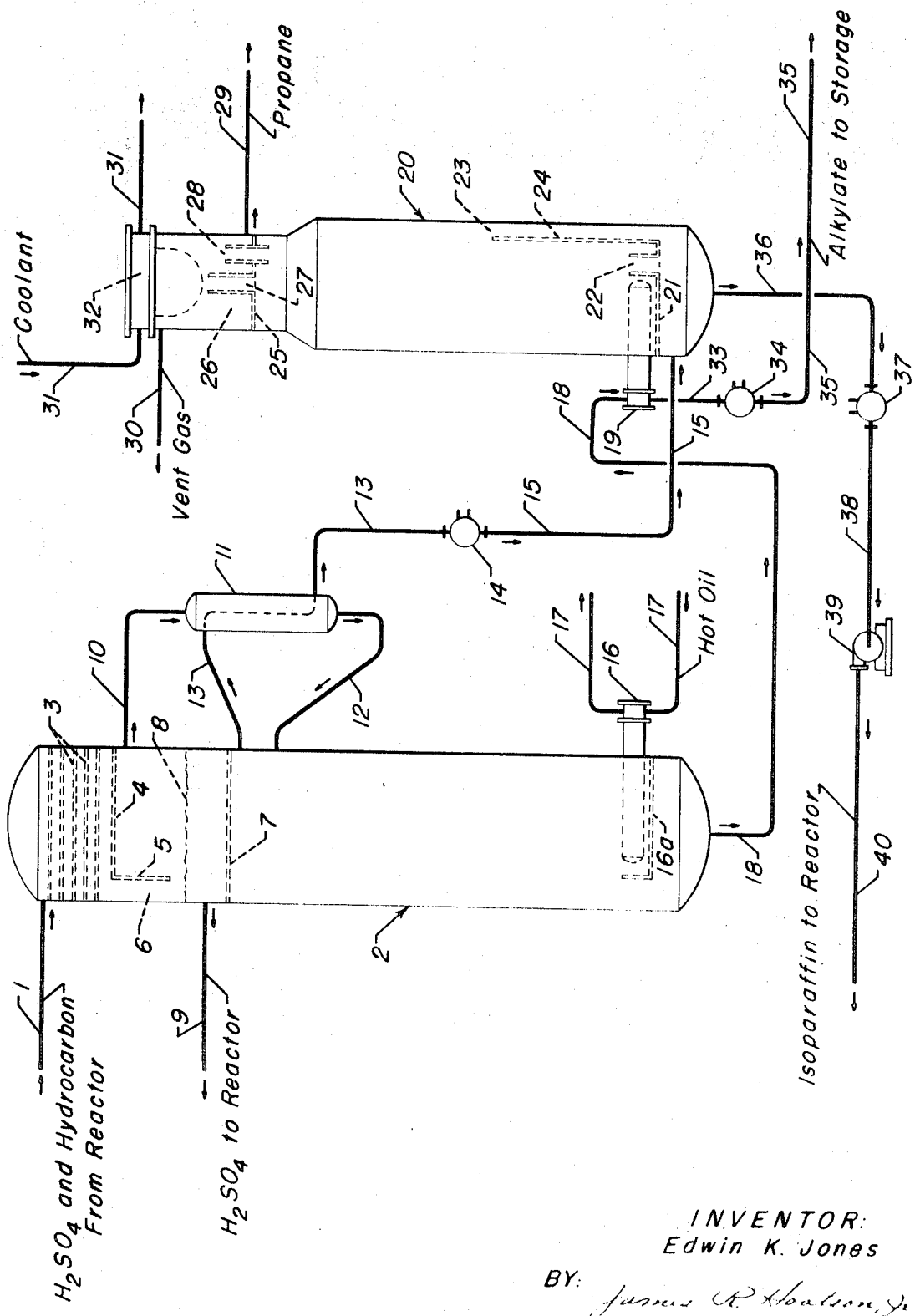

3,594,442
SEPARATION OF REACTOR EFFLUENT FROM SULFURIC ACID ALKYLATION PROCESS
Edwin K. Jones, Kenilworth, Ill., assignor to Universal Oil Products Company, Des Plaines, Ill.
Filed June 9, 1969, Ser. No. 831,330
Int. Cl. C07c *3/54;* B01d *3/00*
U.S. Cl. 260—683.62                                    5 Claims

ABSTRACT OF THE DISCLOSURE

Process for separating hydrocarbons and sulfuric acid catalyst from the total sulfuric acid-hydrocarbon effluent of an isoparaffin-olefin alkylation reaction zone in a processing system wherein a vapor fraction comprising propane and isoparaffinic hydrocarbons is partially condensed in an external heat exchanger means utilizing hydrocarbon separated in a first separation zone as the medium for indirect heat exchange and wherein the desired alkylated fraction is passed to second separation zone reboiler means as the sole source of heat to this reboiler prior to recovery.

BACKGROUND OF THE INVENTION

The invention relates to a process for separating hydrocarbons and sulfuric acid catalyst. It particularly relates to a process for separating hydrocarbons and sulfuric acid catalyst from the total sulfuric acid-hydrocarbon effluent of an isoparaffin-olefin alkylation reaction zone.

It is well known in the prior art that catalytic alkylation utilizing sulfuric acid as the catalyst is an important chemical tool for preparing alkylated hydrocarbons and derivatives thereof. The commercial and industrial demand for these products is exemplified by the demand for isoparaffin hydrocarbons and alkyl-substituted benzenes of the gasoline boiling range and with the demand for alkyl-substituted aromatics suitable for conversion for surfactants, e.g., detergents, wetting agents, and the like.

The catalytic alkylation process to which the present invention is especially applicable consists of a process in which a mixture of hydrocarbons containing isoparaffins such as isobutane, isopentane, and the like, and olefins such as propylene, butylenes, isobutene, amylenes, and the like, are mixed intimately in the presence of a strong acid catalyst such as sulfuric acid for a time sufficient to complete the reaction. The effluent from the reaction zone contains isoparaffin hydrocarbons of higher molecular weight than the isoparaffins in the original mixture. Isobutane has been used almost exclusively because of its reactivity and availability to produce high quality alkylate products. Accordingly, for convenience, the term "alkylate" as used in the specification and claims is intended to embody the higher molecular weight reaction product from the alkylation reaction. In similar manner among the olefins, butenes have been used almost exclusively. Propylene and the pentenes, and even higher boiling olefinic hydrocarbons, can be used according to their availability.

SUMMARY OF THE INVENTION

Accordingly, it is an object of this invention to provide a process for separating hydrocarbons and sulfuric acid catalyst from the total sulfuric acid-hydrocarbon effluent of an isoparaffin-olefin alkylation reaction zone.

It is another object of this invention to provide a separation process in a more facile economical and efficient manner in a particular environment which has presented peculiar and difficult problems.

Therefore, the present invention provides a process for separating hydrocarbons and sulfuric acid catalyst from the total sulfuric acid-hydrocarbon effluent of an isoparaffin-olefin alkylation reaction zone which comprises the steps of: (a) introducing the total sulfuric acid-hydrocarbon effluent from said reaction zone into an upper portion of a first separation zone mantained under separation conditions sufficient to separate said sulfuric acid catalyst from the hydrocarbon portion of said effluent; (b) withdrawing settled sulfuric acid catalyst from an intermediate portion of said first separation zone as an intermediate fraction; (c) partially condensing a hereinafter specified first vapor fraction in external heat exchanger means wherein the hydrocarbon portion of step (a) is withdrawn from said first separation zone, indirectly heat exchanged with said first vapor fraction, and returned directly to said first separation zone at a locus below the locus for withdrawing said first vapor fraction; (d) withdrawing a first vapor fraction comprising propane and isoparaffinic hydrocarbons at a locus below the locus for withdrawing said settled sulfuric acid catalyst; (e) withdrawing, without intervening cooling, alkylated hydrocarbons from a bottoms portion of said first separation zone as an alkylate fraction; (f) introducing said partially condensed fraction of step (c) into a second separation zone and passing said alkylate fraction of step (e) to reboiler means positioned in a lower portion of said second separation zone as the sole source of heat supplied to said reboiler means; (g) withdrawing isoparaffinic hydrocarbon from bottom portion of said second separation zone and propane from an upper portion of said zone; and, (h) recovering the alkylate fraction passed to said reboil means of step (f).

As will be described hereinafter in greater detail, the essence of my invention comprises utilizing a vapor fraction comprising propane and isoparaffin hydrocarbon that is partially condensed in an external heat exchanger zone utilizing the hydrocarbon portion of the effluent that has been separated in the first separation zone as the medium for indirect heat exchange and, in conjunction with this feature, the desired alkylate product fraction is passed without intervening cooling to a second separation zone reboiler means as the sole source of heat to this reboil prior to subsequent recovery of the alkylate produced in the sulfuric acid catalyzed alkylation reaction.

My invention can be more clearly described and illustrated with reference to the attached drawing which is a schematic representation of a preferred embodiment of my invention.

DESCRIPTION OF THE DRAWING

Referring now to the drawing, the total sulfuric acid-hydrocarbon effluent from an isoparaffin-olefin alkylation reaction zone (not shown) wherein sulfuric acid is utilized as the catalyst is introduced via line 1 into first separation zone 2 which is maintained under separation conditions sufficient to separate sulfuric acid catalyst from the hydrocarbon portion of the effluent. In a preferred embodiment, the first separation zone has contacting means 3 such as perforated plates, trays, baffles and the like disposed above horizontal partition 4. Horizontal partition 4 has weir means 5 extending downwardly from the partition to form vertical fluid passageway 6 between the upper and upper intermediate portions of the first separation zone. In the drawing, the numeral 7 represents a second horizontal partition upon which settled sulfuric acid 8 remains until it is withdrawn from the intermediate portion of the first separation zone via line 9 as an intermediate fraction.

The hydrocarbon portion of the total effluent is withdrawn from the first separation zone via line 10 and passed to external heat exchanger means 11 and returned directly to the first separation zone via line 12 at a locus below the locus for withdrawing a hereinafter described first vapor fraction. The first vapor fraction comprises propane and isoparaffin hydrocarbons and is withdrawn from the first separation zone via line 13 at a locus below the locus for withdrawing the settled sulfuric acid catalyst via line 9.

The first separation zone has reboiler means 16 located in a bottom portion of the first separation zone and is disposed in well 16a. A hot oil system represented by the numeral 17 supplies heat to this separation zone.

Alkylated hydrocarbons are withdrawn without intervening cooling via line 18 from a bottoms portions of the first separation zone and are passed to reboiler means 19 positioned in a lower portion of the second separation zone 20 as the sole source of heat supplied to reboiler means 19. Reboiler means 19 is disposed in well 21 with fluid passageway 22 formed by weir means 24 and well 21. The housing contains a vapor riser means 23 communicating with an intermediate portion of said housing and is formed by means 24 and the housing of the second separation zone.

The partially condensed vapor fraction comprising propane and isoparaffinic hydrocarbons is introduced, in a preferred embodiment, via line 13, cooler 14, and line 15 into a bottom portion of second separation zone 20.

The second separation zone makes the separation between the isoparaffinic hydrocarbon and propane. Isoparaffinc hydrocarbon is withdrawn from a bottom portion of second separation zone 20 via line 36, passed through cooler 37 through line 38 via pump 39 and line 40 to provide, in a preferred mode of operation, isoparaffinic hydrocarbon recycle to the alkylation reaction zone.

The propane passes upwardly in second separation zone 20 through vapor riser 27 which is formed by horizontal partition means 25 and weir means 26 into an upper section of the second separation zone. Coolant via line 31 is supplied to cooling means 32 and propane is removed from the second separation zone via line 29. Vent gas, if any, may be removed from the upper portion of the second separation zone via line 30. Reflux comprising propane is refluxed from an upper portion of the second separation zone by liquid downcomer means 28 into an intermediate portion of the second separation zone.

The desired alkylate fraction that was passed to reboiler means 19 by line 18 is recovered and sent to storage via line 33, cooler 34 and line 35.

As will be understood by one skilled in the art, the first separation zone operates so that the zone formed above horizontal partition means 4 is a settling zone to take advantage of the fact that the sulfuric acid alkylation catalyst is heavier than the hydrocarbon portion of the effluent so that the catalyst gravitates downwardly to partition 7 for removal via line 9 from the first separation zone. The remaining hydrocarbon passes via lines 10 and 12 into a lower portion of the first separation zone where the hydrocarbon is heated by reboiler 16. Normal butane vapors, if any, leave the separation zone as a lower fraction (not shown) and the desired heavier alkylate is removed via line 18. The vapors from the stripping section of the first separation zone then pass via line 13, cooler 14 and line 15 to the second separation zone where propane is separated from the isoparaffinic hydrocarbon. In the second separation zone, the propane vapors pass through vapor riser means 27 and are condensed by a water or refrigerated exchanger 32. The propane is then passed to storage vai line 29. The isoparaffinic hydrocarbon is separated as a liquid bottoms product and in a preferred embodiment is passed to the alkylation reactor.

PREFERRED EMBODIMENT

In a particularly preferred embodiment of my invention, this invention provides a process for separating hydrocarbons and sulfuric acid catalyst from the total sulfuric acid-hydrocarbon effluent of an isobutane-butene alkylation reaction zone which comprises the steps of: (a) introducing the total sulfuric acid-hydrocarbon effluent from said reaction zone into an upper portion of a first separation zone maintained under separation conditions sufficient to separate said sulfuric acid catalyst from the hydrocarbon portion of said effluent; (b) withdrawing settled sulfuric acid catalyst from an intermediate portion of said first separation zone as an intermediate fraction; (c) partially condensing a hereinafter specified first vapor fraction in external heat exchanger means wherein the hydrocarbon portion of step (a) is withdrawn from said first separation zone, indirectly heat exchanged with said first vapor fraction, and returned directly to said first separation zone at a locus below the locus for withdrawing said first vapor fraction; (d) withdrawing a first vapor fraction comprising propane and isobutane at a locus below the locus for withdrawing said settled sulfuric acid catalyst; (e) withdrawing normal butane from a lower portion of said first separation zone; (f) withdrawing, without intervening cooling, alkylated hydrocarbons from a bottoms portion of said first separation zone as an alkylate fraction; (g) introducing said partially condensed fraction of step (c) into a second separation zone and passing said alkylate fraction of step (f) to reboiler means positioned in a lower portion of said second separation zone as the sole source of heat supplied to said reboiler means; (h) withdrawing isobutane from a bottom portion of said second separation zone and propane from an upper portion of said zone; and, (i) recovering the alkylate fraction passed to said reboiler means of step (g).

It is apparent that the present invention provides a process for separating hydrocarbons and sulfuric acid catalyst from the total sulfuric acid-hydrocarbon effluent of an isoparaffin-olefin alkylation reaction zone utilizing a simplified processing scheme and a more economical and efficient piping and heating system than previous prior art designs.

I claim as my invention:

1. A process for separating hydrocarbons and sulfuric acid catalyst from the total sulfuric acid-hydrocarbon effluent of an isoparaffin-olefin alkylation reaction zone which comprises the steps of:
   (a) separating said total effluent by gravity settling, in a separation zone superjacent to a hereinafter specified stripping zone, into a sulfuric acid phase and a hydrocarbon phase;
   (b) heating said hydrocarbon phase by indirect heat exchange with a hereinafter specified vapor fraction;
   (c) introducing the resulting heated hydrocarbon phase as feed to the upper portion of a stripping zone;
   (d) supplying reboiling heat to the lower portion of said stripping zone;
   (e) withdrawing an alkylate fraction comprising alkylated hydrocarbons from the bottom portion of said stripping zone and passing said alkylate fraction, without intervening cooling, to the lower portion of a hereinafter specified fractionation zone as the reboiler heating medium therefor;
   (f) withdrawing a vapor fraction comprising propane and isoparaffinic hydrocarbons from said stripping zone at a locus above the feed locus;
   (g) partially condensing said vapor fraction by said indirect heat exchange with said hydrocarbon phase according to step (b);
   (h) passing said partially condensed fraction of step (g) as feed to a fractionation zone maintained under fractionation conditions sufficient to provide an overhead stream comprising propane and a bottoms stream comprising isoparaffinic hydrocarbons;
   (i) supplying the total amount of reboiling heat required for said fractionation zone to the lower portion thereof by indirect exchange with said alkylate fraction of step (e); and
   (j) recovering said alkylate fraction after abstracting heat therefrom according to step (i).

2. The process according to claim 1 wherein said isoparaffin-olefin alkylation reaction zone is processing isobutane and an olefin having from 3 to 5 carbon atoms per molecule.

3. The process according to claim 1 wherein said isoparaffin-olefin alkylation reaction zone is processing isobutane and a butene.

4. The process according to claim 1 wherein said settled sulfuric acid catalyst of step (a) is recycled to the isoparaffin-olefin alkylation reaction zone.

5. The process according to claim 1 wherein said isoparaffinic hydrocarbon of step (h) is recycled to the isoparaffin-olefin alkylation reaction zone.

References Cited

UNITED STATES PATENTS

| 3,370,003 | 2/1968 | Borst, Jr. | 260—683.62 |
| 3,402,123 | 9/1968 | Coste | 260—683.62 |
| Re. 26,060 | 7/1966 | Nathan | 260—683.59 |

DELBERT E. GANTZ, Primary Examiner

G. J. CRASANAKIS, Assistant Examiner

U.S. Cl. X.R.

208—351, 353, 354